United States Patent
Okazawa

(10) Patent No.: US 8,130,408 B2
(45) Date of Patent: Mar. 6, 2012

(54) IMAGE FORMING SYSTEM AND DATA PROCESSING METHOD

(75) Inventor: Takashi Okazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 678 days.

(21) Appl. No.: 12/187,273

(22) Filed: Aug. 6, 2008

(65) Prior Publication Data
US 2009/0041524 A1    Feb. 12, 2009

(30) Foreign Application Priority Data
Aug. 8, 2007    (JP) .................. 2007-206605

(51) Int. Cl.
B41J 11/44    (2006.01)
G06F 15/16    (2006.01)
G06K 15/00    (2006.01)
(52) U.S. Cl. .......... 358/1.18; 709/204; 709/217; 400/76
(58) Field of Classification Search ................. 358/1.15, 358/1.19, 1.13, 1.16, 1.18; 709/217, 204; 400/76
See application file for complete search history.

(56) References Cited

U.S. PATENT DOCUMENTS
7,719,705 B2 *   5/2010   Mach et al. .................. 358/1.15
7,904,529 B2 *   3/2011   Azulai et al. .................. 709/217

FOREIGN PATENT DOCUMENTS
| JP | 5-012288 | 1/1993 |
| JP | 7-121673 | 5/1995 |
| JP | 9-231296 | 9/1997 |
| JP | 2004-287201 | 10/2004 |

* cited by examiner

Primary Examiner — Charlotte M Baker
Assistant Examiner — Justin Katzwhite
(74) Attorney, Agent, or Firm — Canon USA, Inc., I.P. Division

(57) ABSTRACT

The present invention provides a system for printing material information along with two-dimensional coded images which are obtained by converting minutes data blocks and which are to be added to the material information. Specifically, after the material information is obtained from an information processing apparatus and the minutes data blocks obtained using a web camera are received, a minutes data block is extracted from among the minutes data blocks at a predetermined timing. Then, the extracted minutes data block is converted into two-dimensional coded information. The two-dimensional coded information is printed on a corresponding one of a plurality of pages of the material information.

3 Claims, 6 Drawing Sheets

FIG. 8

STORAGE MEDIUM SUCH AS FD AND CD-ROM

| DIRECTORY INFORMATION |
|---|
| FIRST PROCESSING PROGRAM PROGRAM CODE GROUP FOR STEPS OF FLOWCHART IN FIG.2 |
| |
| |
| |
| |
| |
| |
| |

FIG. 9

STORAGE MEDIUM SUCH AS FD AND CD-ROM

| DIRECTORY INFORMATION |
|---|
| FIRST PROCESSING PROGRAM PROGRAM CODE GROUP FOR STEPS OF FLOWCHART IN FIG.3 |
| |
| |
| |
| |
| |
| |
| |

IMAGE FORMING SYSTEM AND DATA PROCESSING METHOD

BACKGROUND OF THE INVENTION

1. Field of the Invention

The present invention relates to an image forming system including an information processing apparatus, an image pickup unit, and an image forming apparatus which are communicated with one another and which are used for a presentation and relates to a data processing method of the image forming system.

2. Description of the Related Art

In general, explanatory material used on a presentation is printed using a printing device or a multifunction peripheral so as to be distributed to attendees of a conference (a first distribution process). Furthermore, in general, there are different alternatives for distributing minutes or memos of the presentation (a second distribution process).

A method for generating two-dimensional barcodes and QR (quick response) codes as two-dimensional encoded information and printing them on a medium has been widely used (as for a technique regarding the QR codes, refer to Japanese Patent Laid-Open No. 9-231296, for example).

Furthermore, Japanese Patent Laid-Open No. 2004-287201 discloses a minutes generation apparatus capable of generating minutes in real time with reference to utterances in a conference and medium information such as image information and document information used in the conference.

Japanese Patent Laid-Open No. 5-12288 discloses a technique of converting document information or image information into barcode information as two-dimensional encoded information and printing the barcode information along with the document information or the image information.

Japanese Patent Laid-Open No. 7-121673 discloses an information provision method for printing text information and barcode information obtained by converting the text information on an identical paper so that the text information and the barcode information are associated with each other. According to this method, information represented by text and barcode information associated with the information represented by text (such as audio information regarding the text, pronunciation information, video information, or recording information) are printed on an identical sheet. According to this method, when a user desires to output the information represented by text from an electric medium, the barcode information is read so that the information represented by text which is associated with the barcode information is output from the electric medium.

In general, in a conference system, the first distribution process and the second distribution process which are described above are separately operated and a result of distribution by means of the first process and a result of distribution by means of the second process are stored in different media.

Accordingly, although conference material prepared before the conference and material such as minutes which is made in accordance with the conference should be managed by being associated with each other as gathered materials, they are separately managed in practice. Therefore, when the conference material prepared before the conference and the material such as minutes are to be merged after the conference, it may be difficult to determine associations between proceedings of the conference and the material.

Furthermore, there has been a demand for management of conference information generated in accordance with information included in the first distribution process in a confidential manner.

Systems which have been widely used do not meet a demand in which conference material is printed and recorded in media as information which is visually understandable whereas contents of minutes is printed and recorded in media as information which is not directly understandable.

SUMMARY OF THE INVENTION

The present invention provides a system capable of printing information on material and an image obtained by two-dimensionally encoding minutes data to be merged with the material.

Specifically, after the material information is obtained from an information processing apparatus and the minutes data blocks obtained using a web camera are received, a minutes data block is extracted from among the minutes data blocks at a predetermined timing. Then, the extracted minutes data block is converted into two-dimensional coded information. The two-dimensional coded information is printed on a corresponding one of a plurality of pages of the material information.

According to a first aspect of the present invention, there is provided an image forming system including an information processing apparatus, an image pickup unit, and an image forming apparatus, each configured to communicate with each other, the image forming system comprising: an obtaining unit configured to obtain material information from the information processing apparatus; a receiving unit configured to receive minutes data blocks obtained using the image pickup unit; a conversion unit configured to convert a minutes data block extracted from among the minutes data blocks into two-dimensional coded information; and a printing unit configured to print the two-dimensional coded information on a corresponding one of a plurality of pages of the material information.

According to a second aspect of the present invention, there is provided an image forming system comprising: an information processing apparatus; an image pickup unit; and an image forming apparatus, the information processing apparatus, the image pickup unit and the image forming apparatus, each configured to communicate with each other, wherein the image pickup unit includes an adding unit configured to receive a page switching request from the information processing apparatus and add page switching information to one of minutes data blocks obtained using the image pickup unit, wherein the information processing apparatus includes an output unit configured to output material information generated using an application to a display unit, and wherein the image forming apparatus includes an obtaining unit configured to obtain the material information from the information processing apparatus, a receiving unit configured to receive the minutes data blocks obtained using the image pickup unit, a conversion unit configured to convert the one of the minutes data blocks extracted, in accordance with the page switching information, from among the minutes data blocks into two-dimensional coded information, and a printing unit configured to print the two-dimensional coded information on a corresponding one of a plurality of pages of the material information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 8 is a diagram illustrating a memory map of a storage medium which stores various data processing programs which are readable using the image forming apparatus according to a second exemplary embodiment of the present invention.

FIG. 9 is a diagram illustrating a memory map of a storage medium which stores various data processing programs which are readable using the information processing apparatus according to the second exemplary embodiment of the present invention.

DESCRIPTION OF THE EXEMPLARY EMBODIMENTS

Embodiments of the present invention will now be described in detail in accordance with the accompanying drawings.

Description of System Configuration

First Exemplary Embodiment

Figure 1:
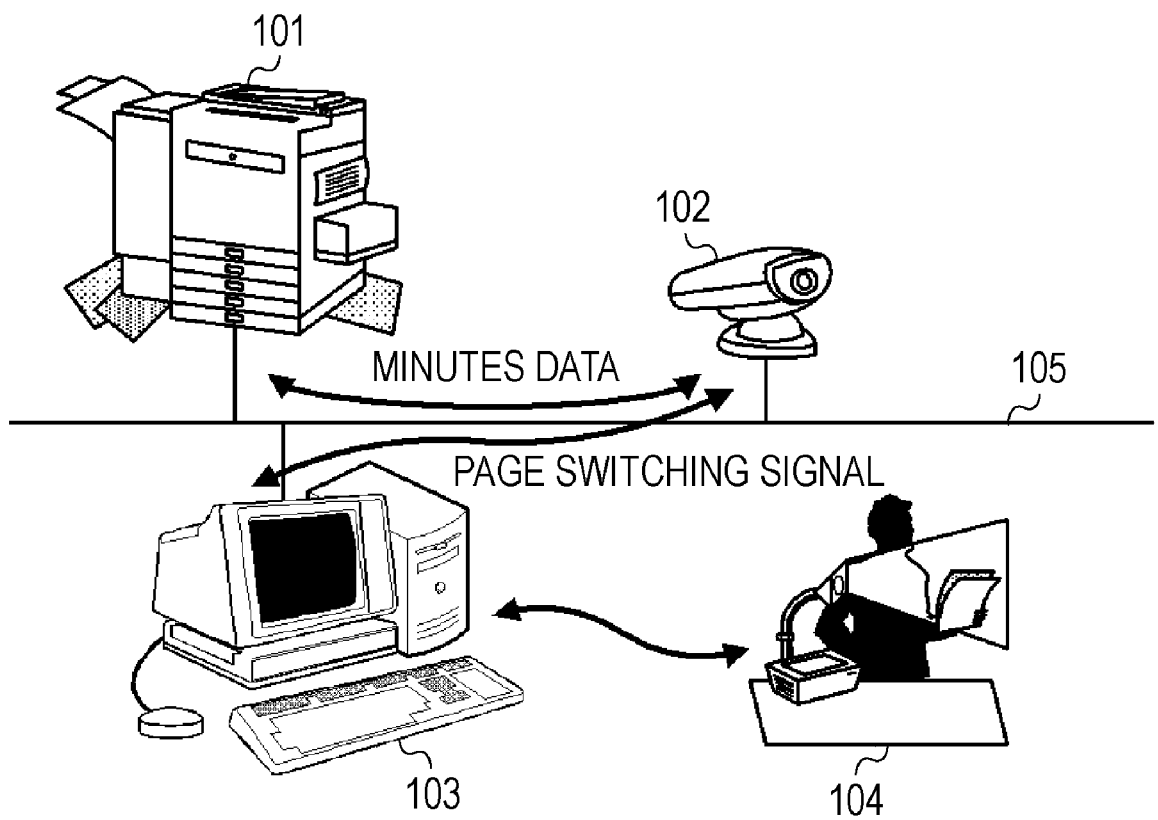
FIG. 1 is a diagram illustrating an image forming system according to a first exemplary embodiment of the present invention.

FIG. 1 is a diagram illustrating an image forming system according to a first exemplary embodiment of the present invention. The image forming system includes an image forming apparatus, an information processing apparatus, a projector serving as a display unit, and a web camera serving as an image pickup unit, which are communicated with one another through a network.

In this exemplary embodiment, an example of a method for recording presentation minutes and minutes memo information simultaneously with printing of presentation explanatory material in a merged manner and restoring data of the minutes as material generated after a conference will be described. Note that in this exemplary embodiment, the minutes data which is meaningful data is converted into encoded data which is not visually understandable for people and the encoded data is printed on a printing medium.

Note that contents of the encoded data representing the minutes data is not recognized when ordinary users see a sheet on which an image corresponding to the encoded data is printed. Specifically, the encoded data is not reproduced as readable minute information unless a person who receives distributed material (on which the image corresponding to the minutes data is printed) operates a reading device of another image processing apparatus in order to read the distributed material.

Note that an image forming apparatus (MFP) 101 has a function of extracting minutes data from among pieces of minutes data representing moving images received from a web camera 102 in accordance with page switching information added when a page switching request is issued from an information processing apparatus 103.

Furthermore, the MFP 101 obtains material to be distributed to attendees of a conference from the information processing apparatus 103 in advance. The MFP 101 specifies a page from among pages of the material to which the minutes data extracted from material information received from the web camera 102 is assigned using page information included in the page switching information. The MFP 101 has a function of converting the material information extracted at a predetermined timing into two-dimensional encoded information so as to print the two-dimensional information on a corresponding one of the pages of the material corresponding to the material information. Note that, in this exemplary embodiment, the material information is generated as a file using a presentation application installed in the information processing apparatus 103. Alternatively, images of the material may be captured by a scanner, for example. Similarly, the material information may be generated using any other application in addition to the presentation application.

Note that the two-dimensional encoded information used in the exemplary embodiment of the present invention corresponds to a two-dimensional barcode or a QR code which is generated using a technique in the related art. In addition, a two-dimensional encoding method for storing a larger amount of information may be employed as an improved technique of generating the two-dimensional barcode and the QR code.

A paper medium on which the two-dimensional encoded information is printed is referred to as a cross-media herein. Similarly, the two-dimensional encoded information printed on the cross-media is referred to as cross-media information, and a printing operation of printing the cross-media information on the cross-media is referred to as cross-media printing herein.

The first embodiment will be described in detail hereinafter.

In FIG. 1, the MFP 101 corresponds to a multifunction peripheral (MFP) including a read unit, a printing unit, and a secondary storage device and is capable of performing print processing of printing data transmitted from an external information processing apparatus. Note that the MFP 101 includes a hard disk, for example, as the secondary storage device used to store therein received printing jobs and image data blocks read using the read unit and controls accesses to box regions assigned to users.

Note that the secondary storage device stores material (electronic data) to be distributed in a conference so that required pages of the material are printed in accordance with an instruction issued using an operation unit or an instruction transmitted from the information processing apparatus, which will be described later.

The electronic data includes files generated using a predetermined application and general electronic documents (such as PDF files). The MFP 101 further includes hardware which enables various image processes such as rotation, resizing, encoding, compression, and decompression to be performed on images. For example, the MFP 101 includes a control board including a CPU (central processing unit), a RAM (random access memory), a ROM (read-only memory), and a CODEC (coder decoder), a communication interface used for communication between the printing unit and the read unit, an interface used for network communication, and a device used for facsimile communication using a public line.

The web camera 102 includes a microphone unit which collects sound in a conference room so as to generate sound information, a camera unit, and an audio/text conversion processor which performs audio analysis processing on the audio information obtained using the microphone unit and converts the audio information into text information. Image information (image streaming data) corresponding to an image obtained using the web camera 102 is output through a LAN (local area network) 105 to an external apparatus. The web camera 102 shoots the conference in the conference room proceeding in accordance with questions and answers so as to generate minutes including explanation of the material made using a projector 104.

Note that although the MFP 101 is taken as an example of the external apparatus in this exemplary embodiment, other apparatuses may be employed. For example, a configuration in which a server apparatus having management authority obtains image information or text information obtained by converting audio information through a network from the web camera 102 and then the MFP 101 obtains the information from the server apparatus through authentication processing may be employed.

Furthermore, in this exemplary embodiment, the web camera 102 shoots the conference having proceedings held in the predetermined conference room so as to generate minutes data. Simultaneously, the web camera 102 communicates with the information processing apparatus (PC) 103 which is connected to the web camera 102 through the LAN 105 so as to receive information indicating a page switching operation. Specifically, the web camera 102 has a function of obtaining the minutes data including information projected on a screen using the projector 104 and information written on a white board, for example, as images.

Note that in a case where the minutes data is obtained using the camera unit, the web camera 102 causes audio/text conversion processor to analyze an input minute image, to extract audio information collected using the microphone unit at a time of the shooting operation, and to perform audio/text conversion processing of converting the extracted audio information into text information.

The web camera 102 outputs the minutes data (a minute memo and minutes, for example) as image information (corresponding to a moving image) obtained using the camera unit through the LAN 105 to the external apparatus.

Note that, in this exemplary embodiment, page switching information obtained from the information processing apparatus 103 may be added to the minutes data, and minute information to be recorded to which the page switching information has been added may be transmitted through the LAN 105 to the external apparatus.

The information processing apparatus 103 is constituted by a computer which is connected to a display apparatus and the projector 104 which are destinations of display through predetermined interfaces.

The information processing apparatus 103 includes hardware sources such as a CPU, a RAM, a ROM, a hard disk, an input device, a display device, and a network communication device. The information processing apparatus 103 further includes software sources such as an operating system (OS), an application, and a device driver.

Note that the information processing apparatus 103 performs data processing instructed by a user by loading the operating system installed in an external storage device such as a hard disk in the RAM and performing various applications.

When a presentation is performed in the predetermined conference room using the projector 104, an application for the presentation is activated in the information processing apparatus 103. An example of such an application includes Power Point produced by Microsoft Corporation.

Then, the information processing apparatus 103 controls the projector 104 to display material used in the presentation in cooperation with the application. Here, the application for the presentation performs switching of pages to be displayed in response to an operation of a pointing device operated by the user. A page switching request is generated in accordance with an instruction issued using a "next page" button or an instruction of page scrolling as a trigger, for example. However, the trigger is not limited to these.

In accordance with the page switching operation, page information may be transmitted through the LAN 105 to the web camera 102.

The projector 104 is connected to the information processing apparatus 103 through a predetermined interface and projects an image corresponding to a display signal transmitted from the information processing apparatus 103 on a screen.

Next, the page switching operation in the presentation using the information processing apparatus 103 will be described.

Figure 2:
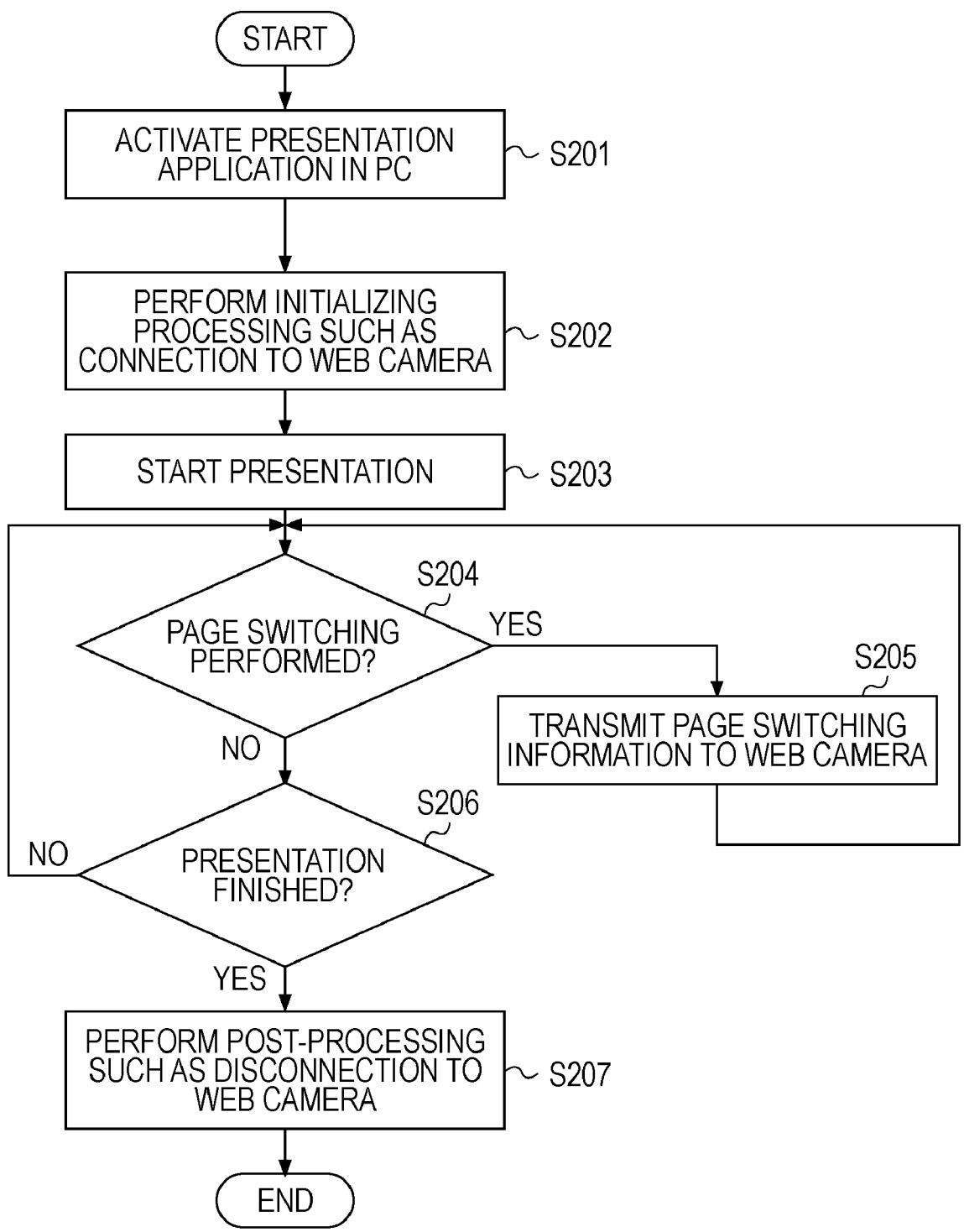
FIG. 2 is a flowchart illustrating a first data processing procedure of an information processing apparatus according to this exemplary embodiment.

FIG. 2 is a flowchart illustrating a first data processing procedure of the information processing apparatus 103 according to this exemplary embodiment. Specifically, an example of the page switching operation performed using the information processing apparatus 103 shown in FIG. 1 will be described. Note that the step S201 to step S207 correspond to processes of the procedure. The CPU of the information processing apparatus 103 shown in FIG. 1 loads a control program into the RAM and executes the program so as to implement the processes of step S201 to step S207.

In step S201, the presentation application is activated in the information processing apparatus 103. The presentation application is not limited to an application based on a specific OS but any other applications may be employed as long as the applications are based on OSs.

In step S202, the information processing apparatus 103 is connected to the web camera 102 through the LAN 105, and thereafter, initialization processing (processing of transmitting/receiving a name of a presentation file to be used, for example) is performed. In step S203, a presenter starts a presentation using material and images projected on a screen using the projector 104. Note that utterances of the presenter and the images projected on the screen are recorded using the web camera 102 so that audio information and image information are generated.

In step S204, it is determined whether a page switching operation was performed while the presenter makes the presentation. When the determination is affirmative, the process proceeds to step S205 where the information processing apparatus 103 transmits page switching information (including time and a page number) to the web camera 102 which is connected to the information processing apparatus 103 through the LAN 105, and then, the process returns to step S204.

When processes similar to that described above are performed and the presentation proceeds, it is determined whether the presentation is to be finished in S206. When the determination is negative, the process returns to step S204 and a process in step S204 is repeatedly performed. Note that the end of presentation may be determined by detecting an operation of the presentation application of closing a file which has been opened, or by other methods.

On the other hand, when the CPU of the information processing apparatus 103 determines the end of the presentation in step S206, the process proceeds to step S207 where the information processing apparatus 103 transmits presentation end information to the web camera 102, and is disconnected from the web camera 102. This process is thus terminated.

The end of the presentation may be instructed using the application or may be instructed through an operation of the presenter.

Processing of collecting minutes data blocks and processing of editing the minutes data blocks performed using the MFP 101 will now be described.

Figure 3:
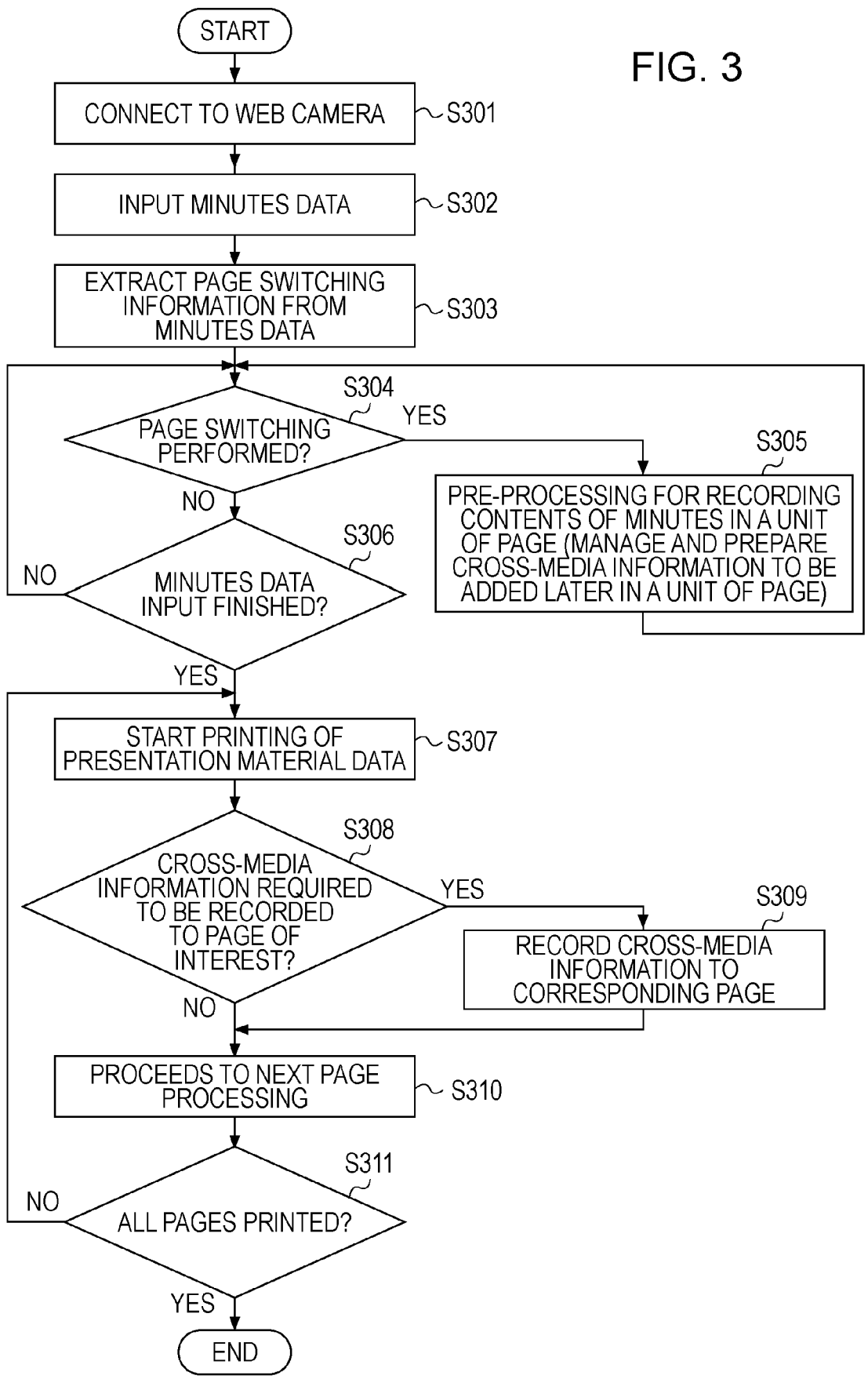
FIG. 3 is a flowchart illustrating a first data processing procedure of an image forming apparatus according to this exemplary embodiment.

FIG. 3 is a flowchart illustrating a first data processing procedure of the image forming apparatus 101 according to this exemplary embodiment. Specifically, an example of the page switching operation performed using the MFP 101 shown in FIG. 1 will be described. Note that the step S301 to step S311 correspond to processes of the procedure. The CPU of the MFP 101 shown in FIG. 1 loads a control program in the RAM and executes the program so as to implement the processes of step S301 to step S311.

In step S301, a connection operation is performed so that the MFP 101 is communicated with the web camera 102. This connection operation is started when the MFP 101 receives a connection request from the web camera 102 as a trigger. Note that another method for triggering the connection operation may be employed in accordance with a network protocol used for communication between the MFP 101 and the web camera 102.

After being connected to the web camera 102, the MFP 101 receives a minutes data block from the web camera 102 in step S302. The minutes data block corresponds to a minutes memo, for example, and is obtained by shooting the conference held in the conference room where the projector 104 is installed.

In step S303, the MFP 101 extracts the page switching information which is transmitted from the information processing apparatus 103 to the web camera 102 from the minutes data block supplied from the web camera 102.

In step S304, the CPU of the MFP 101 determines whether a page switching operation was performed in accordance with the page switching information transmitted from the web camera 102. When the determination is affirmative, the process proceeds to step S305. In step S305, pre-processing is performed for a recording operation of contents of the minutes in a unit of page is performed, and thereafter, the process returns to step S304. The pre-processing corresponds to a preparation operation required to be performed so that the minutes data block is managed by being divided in a unit of page in advance, which will be described later.

When the determination is negative in step S304, the process proceeds to step S306 where the CPU of the MFP 101 determines whether the minutes data block has been received and the division operation of the minutes data has been terminated. When the determination is negative in step S306, the process returns to step S304.

On the other hand, when the determination is affirmative in step S306, the process proceeds to step S307 where the MFP 101 starts printing of an image corresponding to a presentation material data block (first distribution material) transmitted from the information processing apparatus 103. Note that the presentation material data block is stored in advance in the secondary storage device in the MFP 101 as a PDF data block or as a data block having a format suitable for the printing performed by the MFP 101. Note that the PDF data block or the data block having a format suitable for the printing performed by the MFP 101 is obtained by converting a file format of the application of the information processing apparatus 103 (a file format of Power Point produced by Microsoft Corporation).

When the PDF data block is to be obtained, the conversion operation is performed using the information processing apparatus 103 or the MFP 101, whereas when the data block having a format suitable for the printing performed by the MFP 101 is to be obtained, the conversion operation is performed using the MFP 101.

A name of a presentation file to be used is included in the minutes data block. When it is determined printing data matches the minutes data block in a matching operation, the printing operation is started. The printing operation is thus performed on a page-by-page basis.

In step S308, the CPU of the MFP 101 determines whether cross-media information is to be recorded (printed) on a corresponding one of a plurality of pages in accordance with information prepared in step S305. Note that the cross-media information corresponding to the minutes data block is second distribution material corresponding to information recorded using the web camera 102. That is, the cross-media information includes proceedings in association with the presentation which were discussed among the attendees of the conference, utterances of the attendees, and decisions which should not be disclosed to people except for the attendees of the conference. Note that a header which can be recognized in the system may be added to the cross-media information as an identifier.

When the determination is affirmative in step S308, the process proceeds to step S309 where the cross-media information is printed on a corresponding one of the pages. Then, the process proceeds to step S310.

Specifically, the cross-media information is additionally recorded on a margin or a back surface of the corresponding one of the pages. The cross-media information is reproducible as information recognizable by users when specific image processing is performed on image data to be read. Note that any system may be employed for the cross-media information as long as an image or text is converted into a specific code.

On the other hand, when the determination is negative in step S308, the process proceeds to step S310 so that the next page is processed.

In step S311, the CPU of the MFP 101 determines whether all pages of the presentation material have been subjected to the printing operation on a page-by-page basis. When the determination is negative, the process returns to step S307.

On the other hand, when the determination is affirmative, the cross-media printing operation is terminated.

A large number of minutes data blocks each of which has large capacity and which are not visually understandable are added to the distribution material through this printing operation.

Then, the attendees who bring results of the printing operation of the distribution material back to their companies can restore the minutes data blocks using MFPs in their companies by executing applications.

According to this exemplary embodiment, a third party who obtains the information to be used as the conference material can not obtain the contents of the minutes which should be confidentially managed so as to be readable only by the attendees of the conference, since the minutes itself is not printed simultaneously with the printing the conference material. Furthermore, since the minutes data blocks printed on the pages of the distribution material are restored so as to be visually understandable, not only the conference material but also the relationships between the pages of the distribution material and the proceedings discussed in the conference and the minutes memos can be recognized.

In the system shown in FIG. 1, the presenter may make an explanation using one of the pages which has been explained before by returning from a current page in the presentation. That is, a page-returning operation and a page-forwarding operation are performed on the pages in the course of the presentation. In this case, there arises a problem regarding the relationship between the minutes data blocks obtained using the web camera 102 and the pages of the distribution material to which the minutes data blocks are assigned.

To address this problem, when the web camera 102 transmits the minutes data blocks to the MFP 101, page reference histories are added to minutes data blocks corresponding to minutes which are captured in accordance with page switching requests, that is, requests of the page-returning operation or the page-forwarding operation, for example.

A process of determining pages of the distribution material to which the minutes data blocks are assigning will be described hereinafter.

FIGS. 4 to 7 are diagrams illustrating information processing of the image forming system according to this exemplary embodiment.

Figure 4:
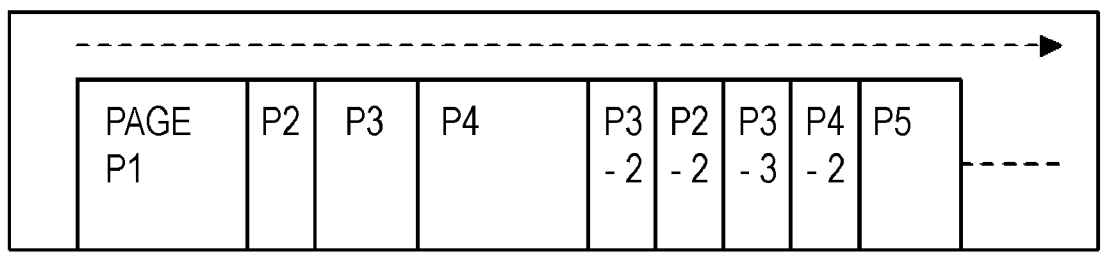
FIG. 4 is a diagram illustrating information processing of the image forming system according to this exemplary embodiment.

FIG. 4 shows examples of images projected using the projector 104 (hereinafter referred to as "projector images") in a time series manner. In this example, the page switching operation is performed after a fourth page P4 is first processed, and accordingly, the fourth page P4 is followed by a third page P3, a second page P2, the third page P3, the fourth page P4, and a fifth page P5.

Here, the web camera 102 may add pieces of page switching information to portions between pages included in the minutes data blocks to be transmitted. In this way, the MFP 101 obtains the minutes data blocks including the pieces of page switching information added thereto from the web camera 102 and controls the second storage device to store the minutes data blocks.

Figure 5:
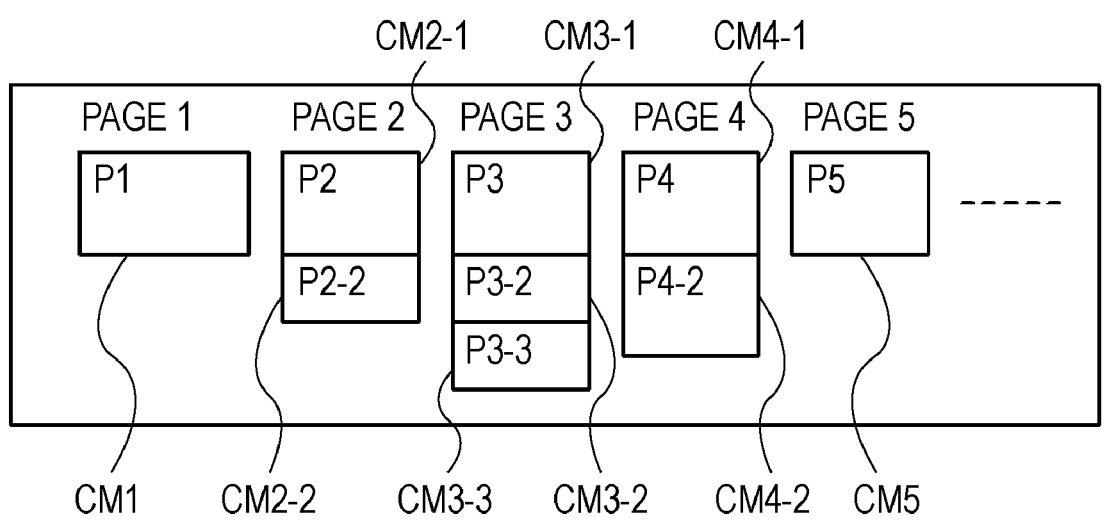
FIG. 5 is a diagram illustrating information processing of the image forming system according to this exemplary embodiment.
Figure 6:
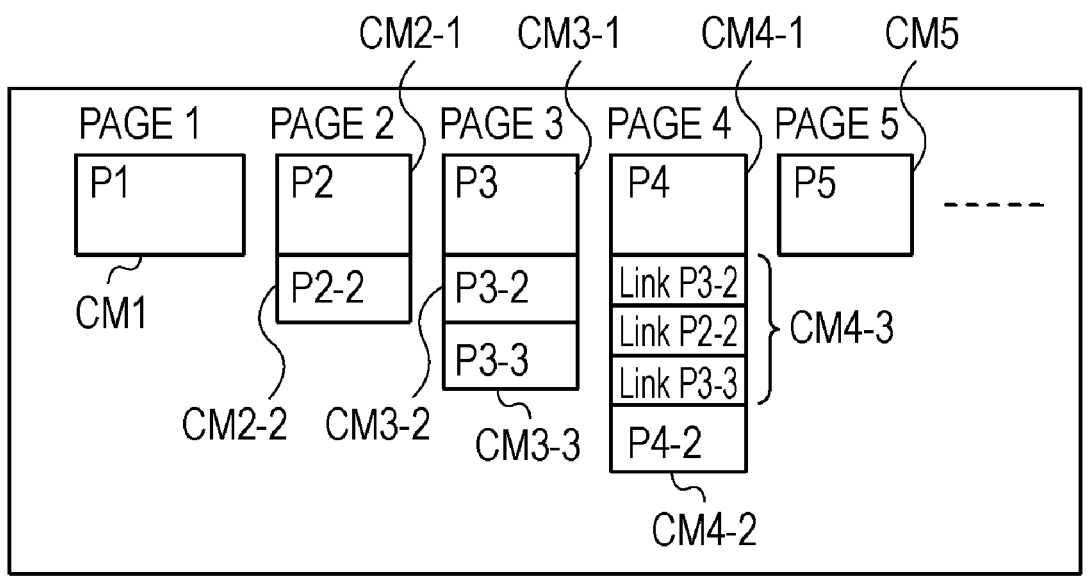
FIG. 6 is a diagram illustrating information processing of the image forming system according to this exemplary embodiment.

The minutes data blocks are printed as pieces of cross-media information along with the distribution material using one of two methods shown in FIGS. 5 and 6 selected in accordance with setting of the printing operation. Note that, in FIG. 5, CM1, CM2-1, CM3-1, CM4-1, and CM5 denote pieces of materials, and CM2-2, CM3-2, CM3-3, CM4-2 denote pieces of cross-media information corresponding to minutes data blocks.

In the first method shown in FIG. 5, the minutes data blocks are printed in pages which are displayed while the minutes data blocks are obtained. In this example, the minutes data blocks are recorded only in the corresponding pages which are displayed while the minutes data blocks are obtained (first example). In this case, pieces of link information generated due to page skip operations are preferably recorded in the pages immediately before the page skip operations are performed so as to facilitate a searching operation performed on the entire minutes.

In the second method shown in FIG. 6, even when the page skip operations are performed, the minutes data blocks are recorded in pages which are displayed while the minutes data blocks are obtained, and in addition to the first method shown in FIG. 5, when the return operation is performed, a link information piece indicating a page which was used before and is referred to again is recorded in the cross-media information. In FIG. 6, CM1, CM2-1, CM3-1, CM4-1, and CM5 denote pieces of material, and CM2-2, CM3-2, CM3-3, and CM4-2 denote pieces of cross-media information corresponding to the minutes data blocks. Furthermore, CM4-3 denotes pieces of link information.

In this way, pieces of link information indicating the page skip operations are obtained as pieces of information after the pieces of cross-media information are restored. It is expected that an advanced searching operation be performed using such pieces of link information.

Figure 7:
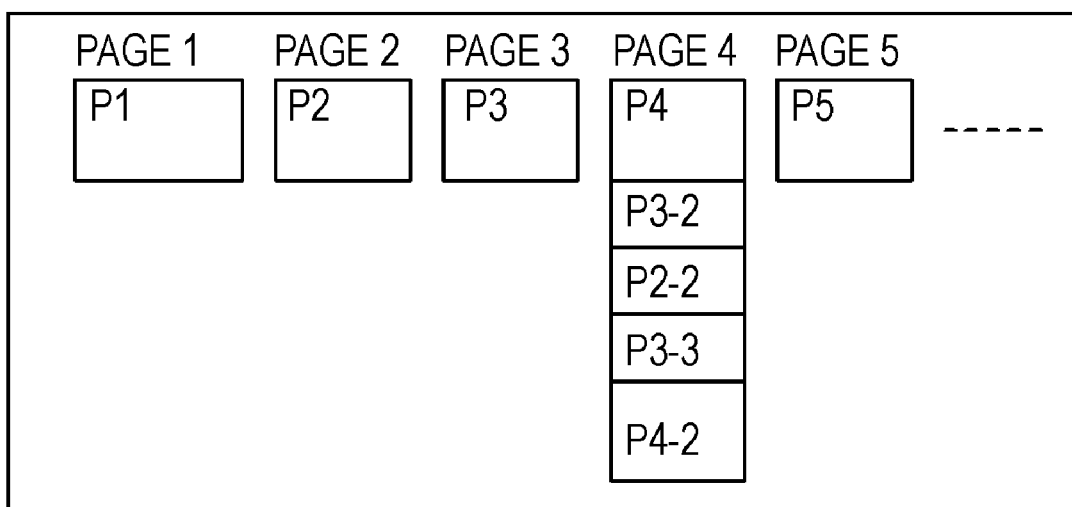
FIG. 7 is a diagram illustrating information processing of the image forming system according to this exemplary embodiment.

Referring to FIG. 7, a method for printing, when the page-returning operation is performed, a minutes data block on a page displayed before a page skip operation is performed is employed. In this method, in a case where a description relating to contents of the fourth page P4 is included in the second page P2, a minutes data block is recorded on the fourth page P4.

Note that, in this exemplary embodiment, when the minutes data blocks are input, the minutes data blocks are simultaneously analyzed and subjected to the printing operation. However, the analysis may be performed first, and thereafter, the printing operation may be performed.

In this exemplary embodiment, the web camera 102 is capable of analyzing the minutes data blocks obtained from image streaming data blocks and transmitting the minutes data blocks to the MFP 101.

However, the MFP 101 may directly receive the image streaming data blocks and extract the minutes data blocks from the image streaming data blocks.

As described above, since the minutes data blocks are printed, that is, cross-media printing is performed when the presentation material is printed, the minutes data blocks are printed as pieces of cross-media information so as to correspond to respective pages of the distribution material displayed in the presentation.

Furthermore, since the minutes data blocks are printed, that is, the cross-media printing is performed, persons who bring results of the printing operation of the distribution material back to their companies can restore (reproduce) the minutes data blocks using MFPs in their companies by executing applications. In addition, the attendees of the conference can immediately refer to the minutes and minutes memos corresponding to individual pages of the distribution material. That is, only the attendees of the conference can easily recognize the relationship between sections of the material and proceedings.

Note that a case where the web camera 102 generates minutes data blocks including audio data blocks and image data blocks is described in this exemplary embodiment. In addition to this, the MFP 101 may analyze and extract minute text information. Furthermore, when the minutes data blocks are subjected to the cross-media printing, the minutes data blocks may be generated from image-audio data blocks extracted from image signals. In this case, the image-audio data blocks correspond to the minutes memos.

According to the exemplary embodiment, the minutes data blocks serving as the pieces of cross-media information are printed along with the distribution material. Accordingly, persons who bring results of the printing operation of the distribution material back to their companies can restore the minutes data blocks using MFPs in their companies and examine the material while checking the minutes, the material and minutes being visually readable. That is, the relationships between the minutes data blocks and pages of the material are easily recognized, and accordingly, the attendees can readily refer to the minutes and the minutes memos on a page-by-page basis.

Second Exemplary Embodiment

Referring now to memory maps shown in FIGS. 8 and 9, a configuration including an image forming apparatus, an image processing apparatus, and data processing programs readable using the information processing apparatus, which are applicable to the image forming system according to a second exemplary embodiment of the present invention will be described.

FIG. 8 is a diagram illustrating a memory map of a storage medium which stores the various data processing programs which are readable using the image forming apparatus according to the second exemplary embodiment of the present invention.

FIG. 9 is a diagram illustrating a memory map of a storage medium which stores the various data processing programs which are readable using the information processing apparatus according to the second exemplary embodiment of the present invention.

Although not shown, information used to manage a program group stored in the storage medium, such as version information and a name of a creator, is also stored in the storage medium. In addition, information based on an OS used in a device on a program reading side, such as icons used to display and identify the programs may be stored in the storage medium.

Furthermore, data blocks associated with the various programs are managed in directories in the storage medium. In addition, programs used to install the various programs in a computer and programs used to decompress when programs to be installed are compressed may be stored in the storage medium.

The functions described with reference to FIGS. 2 and 3 may be implemented by executing, using the host computer, programs which are externally supplied and installed in a host computer. In this case, the present invention is applicable to a case where an information group including programs is supplied from a storage medium such as a CD-ROM, a flash memory, or a FD (flexible disk) or from an external storage medium through a network to an output apparatus.

As described above, the storage medium including program codes of software which realizes the functions of the foregoing exemplary embodiment is supplied to a system or an apparatus. Then, a computer (CPU or MPU) included in the system or the apparatus reads and executes the program codes stored in the storage medium. In this way, effects the same as those attained in the foregoing exemplary embodiment are achieved.

In this case, the program codes read from the storage medium implement the functions according to the present invention, and therefore, the storage medium including the program codes is included in the present invention.

Accordingly, any form of the program may be employed such as object codes, programs to be executed using interpreters, or script data to be supplied to an OS as long as the program functions.

Examples of the storage medium used to supply the programs include a flexible disk, a hard disk, an optical disc, an MO (magneto-optical disc), a CD-ROM, a CD-R (compact disc readable), a CD-RW, a magnetic tape, a nonvolatile memory card, a ROM, and a DVD (digital versatile disc).

In this case, program codes read from the storage medium implement the functions according to the present invention, and therefore, the storage medium including the program codes is included in the present invention.

As an example of a method for supplying the programs, a method for accessing a web site via the Internet using a browser of a client computer and downloading the computer programs according to the present invention or a compressed file including automated installing function into a storage medium such as a hard disk may be employed. Furthermore, the program codes constituting the program according to the present invention may be divided into a plurality of files and downloaded from different web sites. Accordingly, a WWW server and an ftp server, for example which allow a plurality of users to download the program files used to realize the functions of the present invention using a computer are also included in the present invention.

Furthermore, the programs of the present invention may be encoded and stored in a storage medium such as a CD-ROM so as to be distributed to users. In this case, only users who have sufficient qualifications can download key information used for decryption from a web site via the Internet. Then, encrypted programs may be decrypted using the key information and the decrypted programs may be executed so as to be installed in a computer.

The functions according to the foregoing exemplary embodiment are implemented not only by executing the program codes read using the computer but also by performing part of or entire processing using an OS operated in the computer, for example, in accordance with instructions of the program codes.

The program codes read from the storage medium are written in a memory included in a function expansion board inserted into the computer or a memory included in a function expansion unit connected to the computer. Thereafter, in accordance with the instructions of the program codes, a CPU of the function expansion board or the function expansion unit may perform part of or entire processing. The functions of the foregoing exemplary embodiment are implemented in accordance with the processing. It is apparent that such a method is also included in the present invention.

The present invention is not limited to the foregoing exemplary embodiments, and various modifications (including organic combination between the two exemplary embodiments) may be made within the scope of the invention.

Various examples and the exemplary embodiments are described hereinabove, and the spirit and scope of the invention is not limited to the specific descriptions included herein. The scope of the following claims is to be accorded the broadest interpretation so as to encompass all modifications and equivalent structures and functions.

This application claims the benefit of Japanese Application No. 2007-206605 filed Aug. 8, 2007, which is hereby incorporated by reference herein in its entirety.

What is claimed is:

1. A presentation material printing system including a camera shooting minutes and collecting sound, an information processing apparatus, and an image forming apparatus having a printing unit and a scanner unit, wherein the camera comprises:
a generating unit configured to generate minutes data including text data converted from audio data based on the collected sound,
a receiving unit configured to receive page switching information transmitted from the information processing apparatus in accordance with a page switching operation performed in response to a user's instruction to a presentation material which the information processing apparatus controls to display, and an adding unit configured to add a page reference history to the minutes data relating to a certain page in the presentation material based on the received page switching information such that the minutes data relating to the certain page is printed in association with the certain page, and wherein the image forming apparatus comprises:

a receiving unit configured to receive the minutes data with the page reference history added from the camera;

a conversion unit configured to convert the received minutes data into two dimensional coded information;

a printing unit configured to print the presentation material with the two dimensional coded information corresponding to each page of the presentation material being added to a margin of the corresponding page; and a decoding unit configured to read the printed presentation material by a scanner unit and decode the two dimensional coded information.

2. The presentation material printing system according to claim 1, wherein the image forming apparatus comprises:

a reading unit configured to read a printed matter printed by the printing unit, and a restoring unit configured to restore the two-dimensional barcode printed on the read printed matter.

3. A presentation material printing method, the presentation material printing method using a camera for shooting minutes and collecting sound, an information processing apparatus, and an image forming apparatus having a printing unit and a scanner unit, the presentation material printing method comprising:

using the camera to generate minutes data including text data converted from audio data based on the collected sound, receiving at the camera page switching information transmitted from the information processing apparatus in accordance with a page switching operation performed in response to a user's instruction to a presentation material which the information processing apparatus controls to display, and using the camera to add a page reference history to the minutes data relating to a certain page in the presentation material based on the received page switching information such that the minutes data relating to the certain page is printed in association with the certain page, using the image forming apparatus to receive the minutes data with the page reference history added from the camera;

using the image forming apparatus to convert the received minutes data into two dimensional coded information;

using the image forming apparatus to print the presentation material with the two dimensional coded information corresponding to each page of the presentation material being added to a margin of the corresponding page; and using the image forming apparatus to read the printed presentation material by a scanner unit and decode the two dimensional coded information.

* * * * *